F. B. KINNEY.
DEPTH GAGE.
APPLICATION FILED JAN. 10, 1917.

1,248,340.

Patented Nov. 27, 1917.

WITNESS
A. C. Thomas

INVENTOR
Frank B. Kinney
BY
Harry D. Wallace
ATTORNEY

UNITED STATES PATENT OFFICE.

FRANK B. KINNEY, OF SYRACUSE, NEW YORK, ASSIGNOR OF ONE-HALF TO ERNEST J. BUSHNELL, OF SOLVAY, NEW YORK.

DEPTH-GAGE.

1,248,340.  Specification of Letters Patent.  Patented Nov. 27, 1917.

Application filed January 10, 1917. Serial No. 141,698.

*To all whom it may concern:*

Be it known that I, FRANK B. KINNEY, a citizen of the United States, residing at Syracuse, in the county of Onondaga and State of New York, have invented certain new and useful Improvements in Depth-Gages, of which the following is a specification.

This invention relates to improvements in gages, designed for use by tool-makers, machinists, and the like, and has for its object to provide a novel, simple and convenient device for gaging the depth of borings, or other hollow work, as well as, fine and exact measurements or gagings, of various other kinds of tool and machine work. A particular object is to provide a balanced depth-gage which may be operated by one hand, and which is readily, quickly, and accurately adjustable for indicating various precise measurements. And a further object is to provide novel and simple means for locking the gage members in the various adjusted positions.

The details of the invention will be understood from the description which follows, and by reference to the accompanying drawing, in which—

Figure 2:
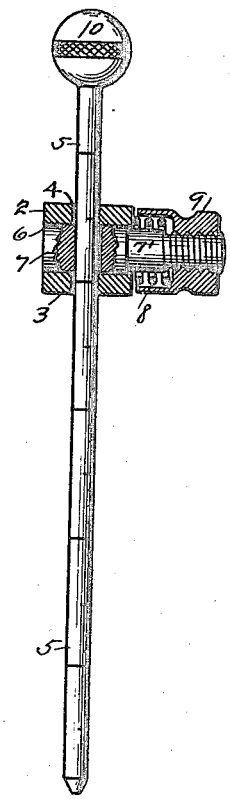
Fig. 2 is a central vertical cross-section, taken on line 2—2 of Fig. 1.
Figure 3:
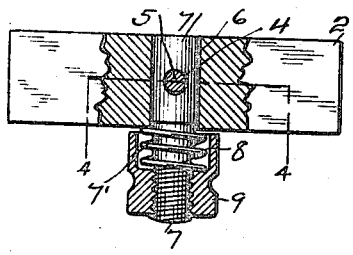
Fig. 3 is a plan and sectional view, the section being taken on line 3—3 of Fig. 1.
Figure 4:
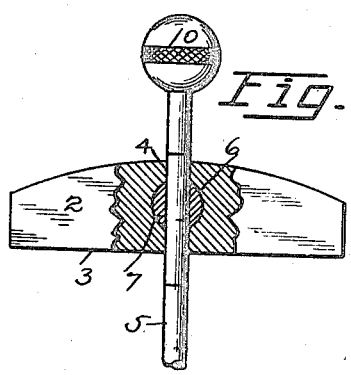
Fig. 4 is a broken view, partially in elevation and partially in section, the section being taken on line 4—4 of Fig. 3.

In the drawing, 2 represents the gage body or head, which may be made of either metal or wood, and preferably having a plane surface 3, for engaging work to be gaged. The body 2 is perforated centrally at right angles to the side 3, as at 4, to receive a movable gage rod or member 5, which is preferably round. The gage member 2 is also perforated transversely, as at 6, at right angles to and intersecting the perforation 4, the perforation 6 being larger in diameter and receiving a locking bolt or member 7, which has a perforation registering with the perforation 4 of the body to receive the gage rod 5. One end of the bolt 7 projects beyond the front side of the body 2 and has a reduced portion 7' which supports a helical spring 8. The extreme outer end of bolt 7 is threaded and is fitted with a nut 9. The nut 9 is counterbored to receive the spring 8, and when the nut is screwed up tight its inner end frictionally engages the front side of the body 2. The screwing up of the nut 9, as described, tends to draw the bolt outwardly, and in doing so, it forces and holds the gage rod 5 tightly against the corresponding side of the perforation 4, which effects the locking of the gage rod rigidly in any desired position. This locking feature is important in case the gage has been set for repeated operations in which the same measurements are required. For temporary gaging, after the rod 5 has been set, the nut 9 is backed off slightly free from the body 2, as shown in Figs. 2 and 3. This allows the spring 8 to exert its tension for resiliently holding the body and the gage rod in the adjusted position. While the parts are in the condition last described, the operator, by pressing inwardly on the nut 9 with his thumb overcomes the tension of the spring 8 sufficiently to allow the rod 5 to be moved by one of his fingers in opposite directions for re-setting the said rod. The instant he releases the pressure on the nut, the spring 8 exerts its tension for again temporarily holding the rod in place.

Figure 1:
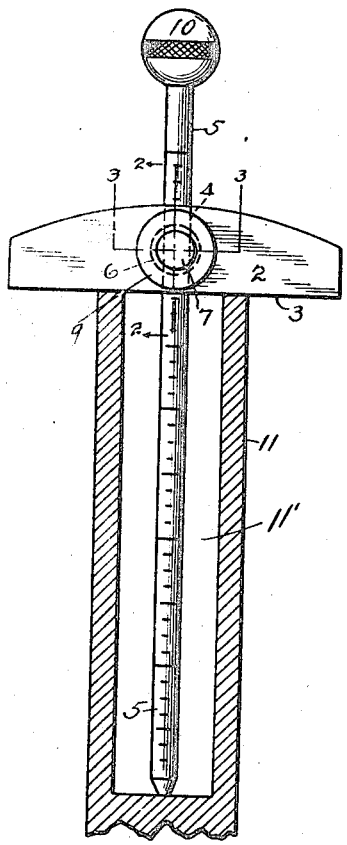
Figure 1 is a side elevation of the complete gage, showing its application to certain work.

The rod 5 has one end fitted with a knob 10, for use in manipulating said part, while the opposite end is preferably tapered to facilitate dressing or truing the rod, and for preventing battering of the said end. The rod 5 is graduated substantially throughout its length as shown, and said graduations may be of the usual fineness for indicating close and exact work. The intersecting perforations 4 and 6 are disposed equal distances from the ends of the member 2, and they are also disposed centrally in the height and breadth of the said member for the purpose of balancing the gage, whether it is being held in the hand, or is resting upon a piece of work, as shown in Fig. 1. In Fig. 1, 11 represents a hollow piece of work to which the gage is applied for ascertaining the depth of the bore or cavity 11'.

From the foregoing it will be understood that my gage may be set for pre-determining a certain work, or the stem 5 may be inserted in or alongside of a piece of work, and the body 2 moved along the said stem until the true measurement is indicated at the intersection of the plane-surface 3 with the graduated side of the stem.

Having thus described my invention, what I claim as new and desire to secure by Letters Patent, is—

1. A depth gage comprising a body having intersecting perforations arranged at right angles to each other, a graduated gage rod movable in one of said perforations, a bolt disposed in the other perforation and pierced by said stem, a hollow nut carried by said bolt for permanently locking said stem in various adjusted positions, and a spring disposed in the hollow nut for resiliently holding said rod in place.

2. A depth gage including a body having a plane work-engaging surface and having intersecting perforations midway between its ends, a bolt disposed in one of said perforations and having an opening alining with the other of said perforations, a graduated rod disposed in said alining perforations in said body and said bolt and movable for bringing the graduations into registry with said plane surface, and resilient means for holding the rod in different adjusted positions.

In testimony whereof I affix my signature.

FRANK B. KINNEY.